United States Patent
Kurokawa

(10) Patent No.: US 12,358,564 B2
(45) Date of Patent: Jul. 15, 2025

(54) VEHICLE ROOF STRUCTURE

(71) Applicant: TOYOTA JIDOSHA KABUSHIKI KAISHA, Toyota (JP)

(72) Inventor: Hiroyuki Kurokawa, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 375 days.

(21) Appl. No.: 18/098,212

(22) Filed: Jan. 18, 2023

(65) Prior Publication Data
US 2023/0234646 A1 Jul. 27, 2023

(30) Foreign Application Priority Data
Jan. 21, 2022 (JP) ................. 2022-008133

(51) Int. Cl.
*B62D 25/06* (2006.01)
*H01Q 1/32* (2006.01)
(52) U.S. Cl.
CPC ........... *B62D 25/06* (2013.01); *H01Q 1/3275* (2013.01)
(58) Field of Classification Search
CPC ........ B62D 25/06; B62D 29/04; H01Q 1/325; H01Q 1/3275
USPC ................... 296/210, 23.01, 3; 343/711, 713
See application file for complete search history.

(56) References Cited

U.S. PATENT DOCUMENTS

| 7,609,217 B2 * | 10/2009 | Noro ................... H01Q 1/1271 343/711 |
| 11,837,771 B2 * | 12/2023 | Borchani ............. H01Q 1/1214 |
| 2016/0297437 A1 | 10/2016 | Hara et al. |

FOREIGN PATENT DOCUMENTS

| JP | 2003-309409 A | 10/2003 |
| JP | 2003-309410 A | 10/2003 |
| JP | 2005-051338 A | 2/2005 |
| JP | 2016-199257 A | 12/2016 |

* cited by examiner

*Primary Examiner* — Dennis H Pedder
(74) *Attorney, Agent, or Firm* — Dinsmore & Shohl LLP

(57) ABSTRACT

There is provided a vehicle roof structure including: a pair of supporting piece sections that are provided at a roof section of a vehicle body, the pair of supporting piece sections being disposed at an interval in a vehicle front-rear direction or a vehicle width direction; a base member to which a communication device is attached, the base member being attached to the supporting piece sections from a vehicle upper side, in a state in which a portion of the base member is disposed between the supporting piece sections; and a resin roof panel that is attached to the base member from the vehicle upper side, the resin roof panel covering the communication device from the vehicle upper side.

4 Claims, 6 Drawing Sheets

VEHICLE ROOF STRUCTURE

CROSS-REFERENCE TO RELATED APPLICATION

This application is based on and claims priority under 35 USC 119 from Japanese Patent Application No. 2022-008133 filed on Jan. 21, 2022, the disclosure of which is incorporated by reference herein.

BACKGROUND

Technical Field

The present disclosure relates to a vehicle roof structure.

Related Art

Japanese Patent Application Laid-Open (JP-A) No. 2003-309409 discloses a mounting structure of an embedded antenna for a vehicle. In this mounting structure of an embedded antenna for a vehicle, a concave portion is formed at a roof section or the like of a vehicle body, and an antenna (communication device) is housed at the concave portion.

However, in the aforementioned related art, the concave portion is provided integrally with the vehicle body, and after the antenna is installed within the concave portion, it is necessary to attach a cover to the vehicle body to cover the concave portion from a vehicle upper side with the cover. Accordingly, in the aforementioned related art, there is room for improvement from the standpoint of simplifying installation work of a communication device with respect to the vehicle body.

SUMMARY

In consideration of the above facts, an object of the present disclosure is to provide a vehicle roof structure that is capable of simplifying installation work of a communication device with respect to a vehicle body.

A vehicle roof structure according to a first aspect of the present disclosure includes: a pair of supporting piece sections that are provided at a roof section of a vehicle body and that are disposed at an interval in a vehicle front-rear direction or a vehicle width direction; a base member to which a communication device is attached and that is attached to the supporting piece sections from a vehicle upper side in a state in which a portion thereof is disposed between the supporting piece sections; and a resin roof panel that is attached to the base member from the vehicle upper side and that covers the communication device from the vehicle upper side.

According to the first aspect of the present disclosure, the pair of supporting piece sections are provided at the roof section of the vehicle body, and these supporting piece sections are disposed at an interval in the vehicle front-rear direction or the vehicle width direction. Furthermore, the base member is attached to these supporting piece sections from the vehicle upper side, the base member is in a state in which a portion thereof is disposed between the supporting piece sections, and the communication device is attached to the base member.

Further, the resin roof panel is attached to the base member from the vehicle upper side, and the communication device is covered by the resin roof panel from the vehicle upper side. Due to this, the communication device can be hidden by the resin roof panel while enabling sending and receiving of radio waves by the communication device, at the vehicle upper side of the communication device.

Furthermore, in the present disclosure, as described above, the communication device and the resin roof panel are attached to the base member, and at the time of assembly of the vehicle, these can be assembled with respect to the vehicle body in a state in which they are integrated, that is to say, in a state in which they are configured as an assembly.

A vehicle roof structure according to a second aspect of the present disclosure is the first aspect, wherein: an attachment piece section that can be supported at the supporting piece sections from a vehicle lower side is provided at the base member; the vehicle roof structure further includes a fastening section that is provided at the attachment piece section and that protrudes from the attachment piece section toward the vehicle lower side; a vehicle body side inserted-through section through which the fastening section can be inserted is provided at the supporting piece sections; and the vehicle roof structure further includes a fastened member that is fastened at the fastening section from the vehicle lower side in a state in which the fastening section is inserted through the vehicle body side inserted-through section.

According to the second aspect of the present disclosure, the attachment piece section is provided at the base member, and the attachment piece section is supported from the vehicle lower side at the supporting piece sections provided at the roof section of the vehicle body. Further, the fastening section is provided at the attachment piece section, and the fastening section protrudes from the attachment piece section toward the vehicle lower side.

Meanwhile, the vehicle body side inserted-through section through which the fastening section can be inserted is provided at the supporting piece sections, and the fastened member is fastened at the fastening section from the vehicle lower side in a state in which the fastening section is inserted through the vehicle body side inserted-through section. Consequently, in the present disclosure, when an assembly in which the base member, the communication device, and the resin roof panel are integrated is assembled with respect to the vehicle body, the fastening section is inserted through the vehicle body side inserted-through section, whereby positioning of the assembly can be carried out.

A vehicle roof structure according to a third aspect of the present disclosure is the second aspect, wherein: a head section of a weld bolt including a shaft section serving as the fastening section is joined to the attachment piece section from the vehicle upper side; and the attachment piece section includes a joining surface section that is provided integrally with the attachment piece section and that is joined to the resin roof panel further toward the vehicle upper side than the head section.

According to the third aspect of the present disclosure, the head section of the weld bolt is joined to the attachment piece section of the base member from the vehicle upper side, and the shaft section of the weld bolt protrudes from the attachment piece section toward the vehicle lower side. Consequently, in the present disclosure, the base member can be more firmly attached to the vehicle body, as compared to a configuration in which the base member is attached to the vehicle body via a stud bolt joined to the attachment piece section of the base member.

Further, the joining surface section is provided at the attachment piece section of the base member, integrally with the attachment piece section, and the joining surface section is joined to the resin roof panel further toward the vehicle upper side than the head section of the weld bolt. Due to this, interference between the head section of the weld bolt and the resin roof panel can be suppressed.

A vehicle roof structure according to a fourth aspect of the present disclosure is any one of the first to third aspects, wherein: the communication device includes a case made of resin that includes a case main body section that configures an outer shell, and a locking section that is provided at a portion at a vehicle lower side of the case main body section; the base member includes a lower wall section that configures a portion at a vehicle lower side of the base member; a base side inserted-through section through which the case main body section can be inserted in a vehicle up-down direction is provided at the lower wall section, and the locking section can be locked at a peripheral edge of the base side inserted-through section; and the case is attached in a detachable state to the lower wall section.

According to the fourth aspect of the present disclosure, the communication device includes the case made of resin that includes the case main body section that configures the outer shell thereof, and the locking section that is provided at the portion at the vehicle lower side of the case main body section.

Meanwhile, the base side inserted-through section through which the case main body section of the case of the communication device can be inserted in the vehicle up-down direction is provided at the lower wall section configuring the portion at the vehicle lower side of the base member. Furthermore, in the present disclosure, the case is attached in a detachable state to the lower wall section in a state in which the locking section of the case of the communication device is locked at the peripheral edge of the base side inserted-through section of the lower wall section.

Consequently, in the present disclosure, in a state in which the communication device, the base member, and the resin roof panel are attached to the vehicle body, the main portion of the communication device is housed in a space between the lower wall section of the base member and the resin roof panel.

Furthermore, in a case in which maintenance work or the like is performed on the communication device, the case is removed from the lower wall section, and the locked state between the locking section and the peripheral edge of the base side inserted-through section is released, whereby the communication device can be removed from the base member toward the vehicle lower side. Meanwhile, in a case in which the communication device is re-installed, the communication device can be attached to the lower wall section in a state in which the case main body section of the communication device is inserted from the base side inserted-through section to between the base member and the resin roof panel, and in which the locking section is locked at the peripheral edge of the base side inserted-through section to position the communication device.

Consequently, in the present disclosure, at the time of assembly of the vehicle, the base member, the communication device, and the resin roof panel can be assembled with respect to the vehicle body in a state in which they are configured as an assembly, and at the time of performing maintenance or the like on the communication device, the communication device can be attached and detached as a single body.

As described above, the vehicle roof structure according to the first aspect of the present disclosure has an effect in that installation work of the communication device with respect to the vehicle body can be simplified.

The vehicle roof structure according to the second aspect of the present disclosure has an effect in that efficiency of assembly work of the communication device can be improved.

The vehicle roof structure according to the third aspect of the present disclosure has an effect in that the communication device and peripheral components thereof can be fixed in a stable state.

The vehicle roof structure according to the fourth aspect of the present disclosure has an effect in that the installation work of the communication device with respect to the vehicle body can be simplified, while improving the efficiency of maintenance work on the communication device from an inner side of the vehicle.

BRIEF DESCRIPTION OF THE DRAWINGS

Exemplary embodiments of the present disclosure will be described in detail based on the following figures, wherein.

DETAILED DESCRIPTION

First Exemplary Embodiment

A first exemplary embodiment of a vehicle roof structure according to the present disclosure will be explained below, with reference to FIG. 1 to FIG. 4. It should be noted that an arrow FR illustrated as appropriate in the respective drawings indicates a vehicle front side of a "vehicle 10" to which the vehicle roof structure according to the present exemplary embodiment has been applied, an arrow UP indicates a vehicle upper side of the vehicle 10, and an arrow LH indicates a vehicle width direction left side of the vehicle 10.

Figure 4:
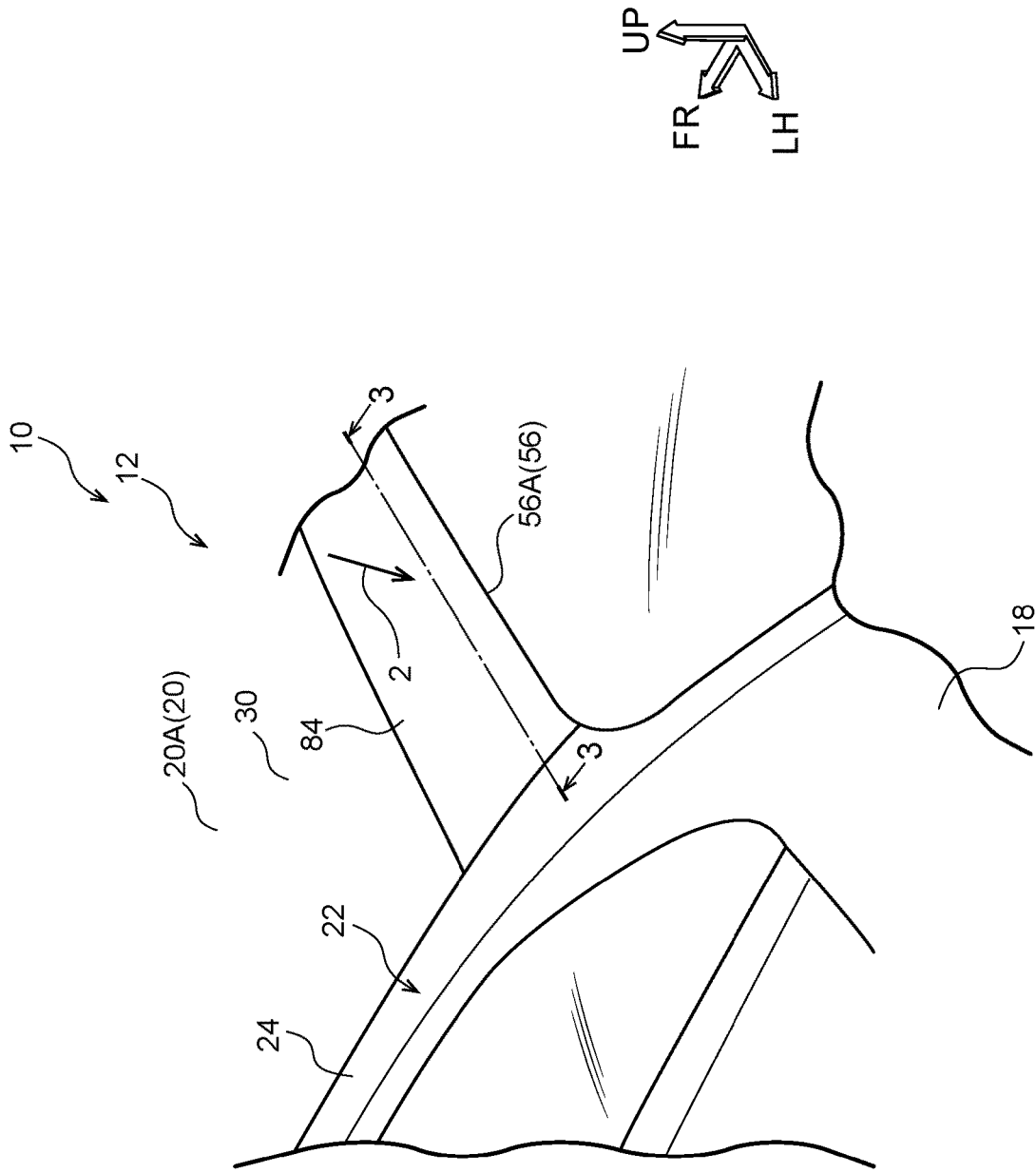
FIG. 4 is a perspective view schematically illustrating a configuration of a vehicle body to which the vehicle roof structure according to the first exemplary embodiment has been applied, viewed from a vehicle rear left side.

First, a schematic configuration of a "vehicle body 12" configuring a main portion of a vehicle cabin of the vehicle 10 will be explained, with reference to FIG. 4. The vehicle body 12 includes a pair of right and left front pillars 14 (refer to FIG. 5), a pair of right and left center pillars 16 (refer to FIG. 5), and a pair of right and left rear pillars 18 at vehicle width direction outer sides thereof. Upper ends of each of the front pillars 14, the center pillars 16, and the rear pillars 18 are connected by a pair of roof side rails 22 configuring a part of a "roof section 20" of the vehicle body 12. It should be noted that the vehicle body 12 is configured symmetrically with respect to a center line CL (refer to FIG. 2) extending in a vehicle front-rear direction.

Figure 3:
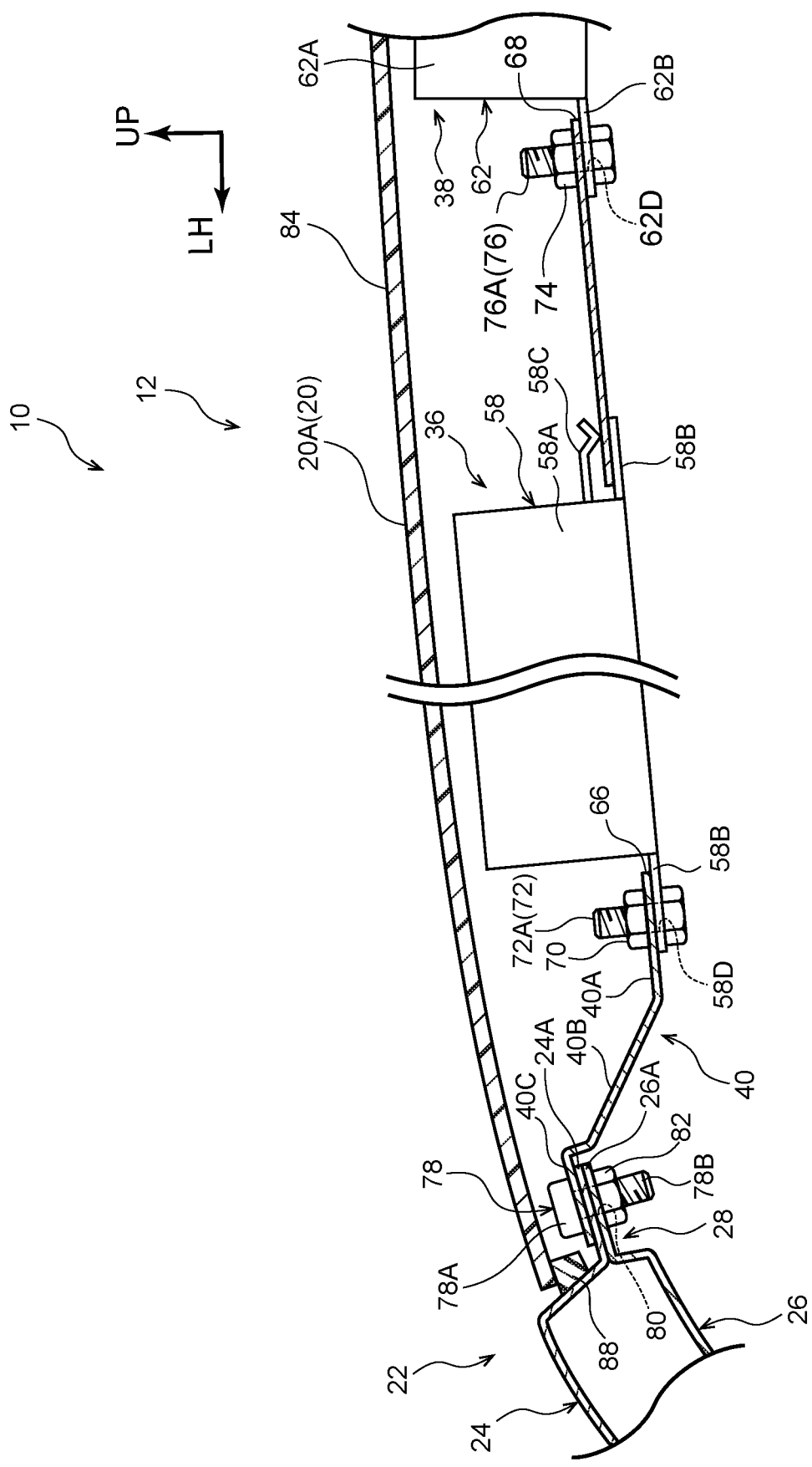
FIG. 3 is a cross-sectional view (cross-sectional view illustrating a state sectioned along a line 3-3 in FIG. 4) schematically illustrating a configuration of a main portion of a vehicle body to which the vehicle roof structure according to the first exemplary embodiment has been applied)

The roof side rails 22 are disposed spaced apart from each other in a vehicle width direction and extend in the vehicle front-rear direction. As illustrated in FIG. 3, the roof side rails 22 are configured to include an outer panel 24 configuring a portion at a vehicle width direction outer side thereof, and an inner panel 26 configuring a portion at a vehicle width direction inner side thereof. The roof side rail 22 is configured to be a closed cross-sectional structure in which a cross-section viewed from the vehicle front-rear direction is a closed cross-section, due to a flange section 24A of the outer panel 24 and a flange section 26A of the inner panel 26 being joined at a non-illustrated joining section formed by spot welding or the like. It should be noted that, hereinafter, aggregates of the flange section 24A and the flange section 26A disposed in a pair in the vehicle width direction, that is to say, plate-shaped portions extending from the roof side rails 22 toward the vehicle width direction inner side, will be referred to as "supporting piece sections 28".

Meanwhile, a roof panel 30 is bridged between the roof side rails 22, and the roof panel 30 is formed by pressing a steel plate and is configured to have a plate shape extending in the vehicle front-rear direction and the vehicle width direction with a plate thickness direction thereof being a vehicle up-down direction. Further, an upper surface of the roof panel 30 constitutes a part of a design surface 20A at a vehicle upper side of the roof section 20.

Figure 1:
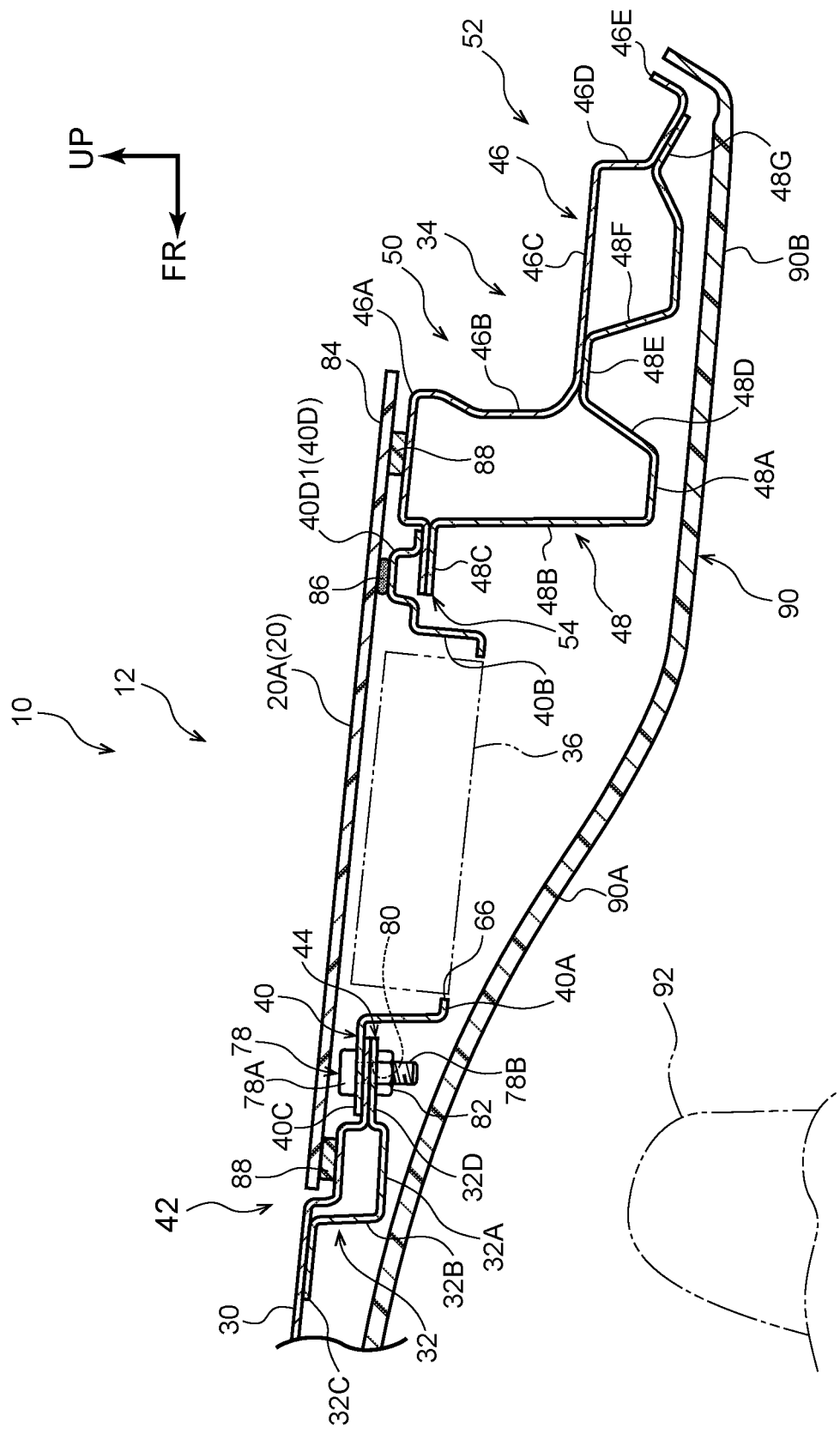
FIG. 1 is a cross-sectional view (cross-sectional view illustrating a state sectioned along a line 1-1 in FIG. 2) schematically illustrating a configuration of a main portion of a vehicle body to which a vehicle roof structure according to a first exemplary embodiment has been applied.

As illustrated in FIG. 1, a first feature of the present exemplary embodiment is that a portion at a vehicle rear side of the roof section 20 is reinforced by a roof reinforcement 32 and a rear header reinforcement 34. Further, a second feature is that a pair of an "antenna unit 36" and an "antenna unit 38" serving as a communication device, which will be described later, are supported by a "base member 40". A configuration of the portion at the vehicle rear side of the roof section 20, centered on the above-described constituent elements, will be explained in detail below.

The roof reinforcement 32 is formed by pressing a steel plate and is attached from a vehicle lower side to a portion at a vehicle rear side of the roof panel 30 to thereby reinforce this portion.

More specifically, the roof reinforcement 32 is configured to include a lower wall section 32A, a vertical wall section 32B, a front side extending wall section 32C, and a rear side extending wall section 32D. The lower wall section 32A configures a portion at a vehicle lower side of the roof reinforcement 32 and extends in the vehicle width direction with a plate thickness direction thereof being the vehicle up-down direction.

The vertical wall section 32B extends from a peripheral edge at a vehicle front side of the lower wall section 32A toward the vehicle upper side with a plate thickness direction thereof being the vehicle front-rear direction, and the front side extending wall section 32C extends from a peripheral edge at a vehicle upper side of the vertical wall section 32B toward the vehicle front side with a plate thickness direction thereof being the vehicle up-down direction. The front side extending wall section 32C is joined to the roof panel 30 by a non-illustrated joining section formed by welding or the like in a state in which the front side extending wall section 32C is abutted against the roof panel 30 from the vehicle lower side.

Meanwhile, the rear side extending wall section 32D extends from a peripheral edge at a vehicle rear side of the lower wall section 32A toward the vehicle rear side with a plate thickness direction thereof being the vehicle up-down direction, and is joined to a peripheral edge at a vehicle rear side of the roof panel 30 by a non-illustrated joining section formed by welding or the like in a state in which the rear side extending wall section 32D is abutted against the peripheral edge at the vehicle rear side of the roof panel 30 from the vehicle lower side. It should be noted that the peripheral edge at the vehicle rear side of the roof panel 30 is positioned further toward the vehicle lower side than a portion of the roof panel 30 at a vehicle front side of this peripheral edge. Further, peripheral edges at vehicle width direction outer sides of the roof reinforcement 32 are joined to the roof side rails 22 by non-illustrated joining sections formed by welding or the like.

Furthermore, in the present exemplary embodiment, due to the roof reinforcement 32 being configured as described above, a first closed cross-sectional structure section 42 is configured along the peripheral edge at the vehicle rear side of the roof panel 30. It should be noted that, hereinafter, an aggregate of the peripheral edge at the vehicle rear side of the roof panel 30 and the rear side extending wall section 32D, that is to say, a plate-shaped portion extending from the first closed cross-sectional structure section 42 toward the vehicle rear side, will be referred to as a "supporting piece section 44".

Meanwhile, the rear header reinforcement 34 is configured to include a rear header upper panel 46 configuring a portion at a vehicle upper side thereof, and a rear header lower panel 48 configuring a portion at a vehicle lower side thereof.

More specifically, the rear header upper panel 46 is formed by pressing a steel plate and is configured to include a first upper wall section 46A, a first vertical wall section 46B, a second upper wall section 46C, a second vertical wall section 46D, and a rear side extending wall section 46E. The first upper wall section 46A configures a portion at a vehicle upper side of the rear header upper panel 46 and extends in the vehicle width direction and the vehicle front-rear direction with a plate thickness direction thereof being the vehicle up-down direction.

The first vertical wall section 46B extends from a peripheral edge at a vehicle rear side of the first upper wall section 46A toward the vehicle lower side with a plate thickness direction thereof being the vehicle front-rear direction, and the second upper wall section 46C extends from a peripheral edge at a vehicle lower side of the first vertical wall section 46B toward the vehicle rear side with a plate thickness direction thereof being the vehicle up-down direction.

Furthermore, the second vertical wall section 46D extends from a peripheral edge at a vehicle rear side of the second upper wall section 46C toward the vehicle lower side with a plate thickness direction thereof being the vehicle front-rear direction, and the rear side extending wall section 46E extends from a peripheral edge at a vehicle lower side of the second vertical wall section 46D toward a vehicle rearward and downward side. It should be noted that a portion at a vehicle rear side of the rear side extending wall section 46E extends toward the vehicle upper side, and that a non-illustrated weather strip is attached to this portion.

Meanwhile, the rear header lower panel 48 is formed by pressing a steel plate and is configured to include a first lower wall section 48A, a first vertical wall section 48B, a front side extending wall section 48C, a second vertical wall section 48D, a connecting wall section 48E, a third vertical wall section 48F, and a rear side extending wall section 48G.

The first lower wall section 48A configures a portion at a vehicle lower side of a portion at a vehicle front side of the rear header lower panel 48 and extends in the vehicle width direction with a plate thickness direction thereof being the vehicle up-down direction.

The first vertical wall section 48B extends from a peripheral edge at a vehicle front side of the first lower wall section 48A toward the vehicle upper side with a plate thickness direction thereof being the vehicle front-rear direction, and the front side extending wall section 48C extends from a peripheral edge at a vehicle upper side of the first vertical wall section 48B toward the vehicle front side with a plate thickness direction thereof being the vehicle up-down direction. Furthermore, the front side extending wall section 48C is joined to a peripheral edge at a vehicle front side of the first upper wall section 46A of the rear header upper panel 46 by a non-illustrated joining section formed by welding or the like in a state in which the front side extending wall section 48C is abutted against the peripheral edge at the vehicle front side of the first upper wall section 46A of the rear header upper panel 46 from the vehicle lower side.

Meanwhile, the second vertical wall section 48D extends from a peripheral edge at a vehicle rear side of the first lower wall section 48A toward a vehicle rearward and upward side with a plate thickness direction thereof being the vehicle front-rear direction, and the connecting wall section 48E extends from a peripheral edge at a vehicle upper side of the second vertical wall section 48D toward the vehicle rear side with a plate thickness direction thereof being the vehicle up-down direction. Furthermore, the connecting wall section 48E is joined to a portion at a vehicle front side of the second upper wall section 46C of the rear header upper panel 46 by a non-illustrated joining section formed by welding or the like in a state in which the connecting wall section 48E is abutted against the portion at the vehicle front side of the second upper wall section 46C of the rear header upper panel 46 from the vehicle lower side.

The third vertical wall section 48F extends from a peripheral edge at a vehicle rear side of the connecting wall section 48E toward the vehicle lower side with a plate thickness direction thereof being the vehicle front-rear direction, the rear side extending wall section 48G extends from a peripheral edge at a vehicle lower side of the third vertical wall section 48F toward the vehicle rear side, and the rear side extending wall section 48G is joined to a portion at a vehicle front side of the rear side extending wall section 46E of the rear header upper panel 46 by a non-illustrated joining section formed by welding or the like. It should be noted that peripheral edges at vehicle width direction outer sides of the rear header reinforcement 34 are joined to the roof side rails 22 by non-illustrated joining sections formed by welding or the like.

In the present exemplary embodiment, due to the rear header reinforcement 34 being configured as described above, a second closed cross-sectional structure section 50 is configured at a portion at a vehicle front side of the rear header reinforcement 34. Further, a third closed cross-sectional structure section 52 is configured at a portion at a vehicle rear side of the rear header reinforcement 34.

More specifically, the second closed cross-sectional structure section 50 is configured to include the first upper wall section 46A, the first vertical wall section 46B, the first lower wall section 48A, and the first vertical wall section 48B. The second closed cross-sectional structure section 50 is configured to have a closed cross-sectional shape that extends in the vehicle width direction and has a shape viewed from the vehicle width direction that is larger in the vehicle up-down direction than a shape of the first closed cross-sectional structure section 42 viewed from the vehicle width direction.

It should be noted that, hereinafter, an aggregate of the front side extending wall section 48C and the peripheral edge at the vehicle front side of the first upper wall section 46A, that is to say, a plate-shaped portion extending from a portion at a vehicle upper side of the second closed cross-sectional structure section 50 toward the vehicle front side, will be referred to as a "supporting piece section 54".

Meanwhile, the third closed cross-sectional structure section 52 is configured to include the second upper wall section 46C, the second vertical wall section 46D, the third vertical wall section 48F, and the rear side extending wall section 48G. The third closed cross-sectional structure section 52 is configured to have a closed cross-sectional shape that extends in the vehicle width direction and has a shape viewed from the vehicle width direction that is smaller than the shape of the second closed cross-sectional structure section 50 viewed from the vehicle width direction, and an upper edge 56A of a back door opening 56 is reinforced by the third closed cross-sectional structure section 52 (refer to FIG. 4).

Figure 2:
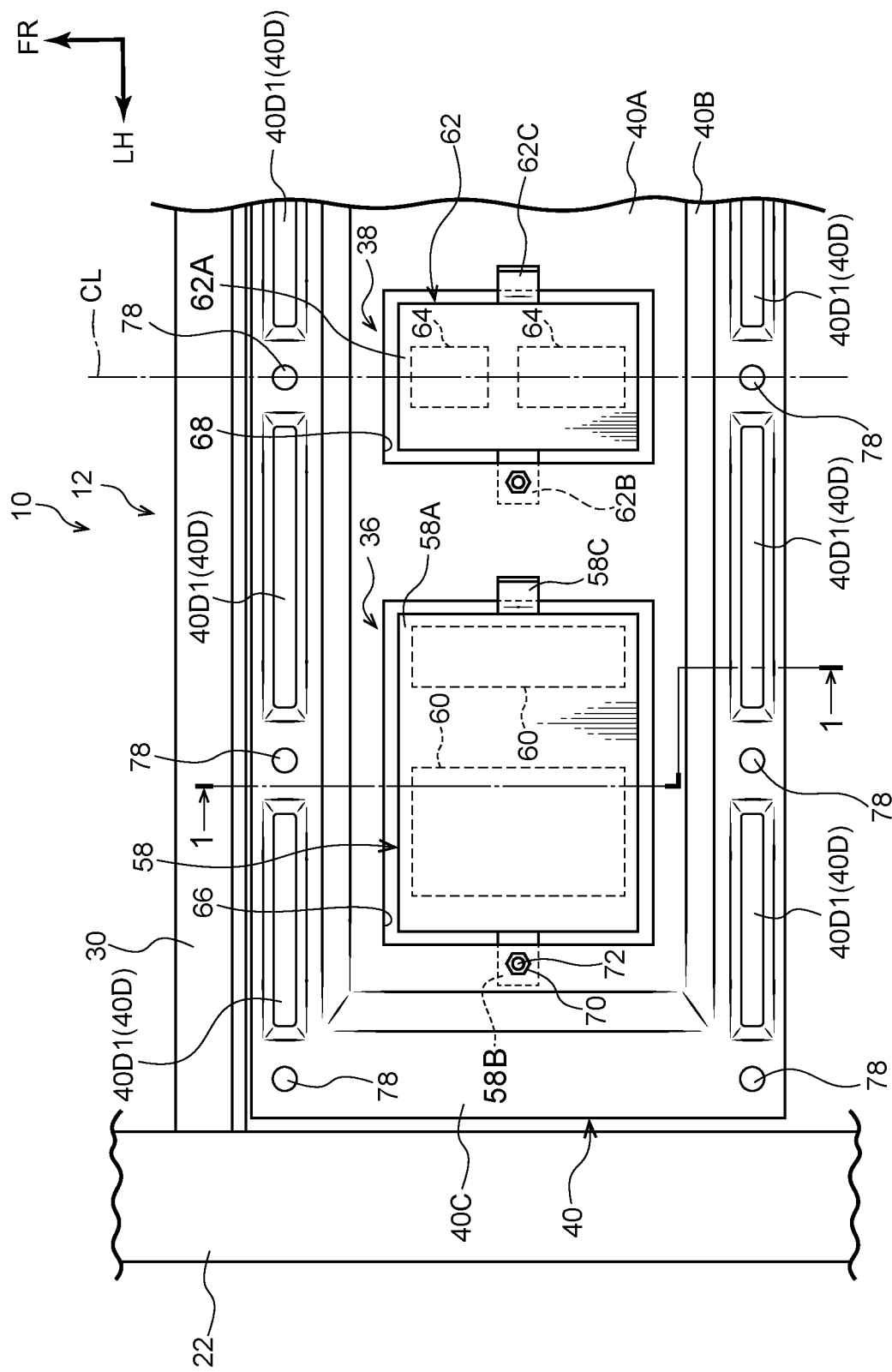
FIG. 2 is a plan view (view seen along a two-directional arrow in FIG. 4) schematically illustrating a configuration of a main portion of a vehicle body to which the vehicle roof structure according to the first exemplary embodiment has been applied.

As illustrated in FIG. 2 and FIG. 3, the antenna unit 36 includes a "case 58" configured by a material such as a resin or the like that is capable of transmitting radio waves, and a plurality of antennas 60 that are capable of at least one of sending or receiving radio waves.

More specifically, the case 58 is configured to include a "case main body section 58A" configuring an outer shell of the antenna unit 36, a pair of attachment plate sections 58B, and a "locking section 58C". The case main body section 58A is configured to have a rectangular box shape when viewed from the vehicle up-down direction, and the antennas 60 are housed at the case main body section 58A.

The attachment plate sections 58B are respectively provided at one side and the other side in the vehicle width direction at a portion at a vehicle lower side of the case main body section 58A, and are configured to have a plate shape with a plate thickness direction thereof being the vehicle up-down direction. Furthermore, a penetrating section 58D is provided at the attachment plate section 58B at the one side in the vehicle width direction, and the locking section 58C is provided at a vehicle upper side of the attachment plate section 58B at the other side in the vehicle width direction.

The locking section 58C is configured to have a plate shape extending from the case main body section 58A in the vehicle width direction, and is in a state in which a portion at a distal end side thereof protrudes toward the vehicle lower side. Furthermore, the locking section 58C is configured to be capable of holding a portion of the base member 40 together with the attachment plate section 58B at the other side in the vehicle width direction, which is positioned at the vehicle lower side thereof.

Meanwhile, the antenna unit 38 includes a "case 62" configured by a material such as a resin or the like that is capable of transmitting radio waves, and a plurality antennas 64 that are capable of at least one of sending or receiving radio waves.

Similarly to the case 58, the case 62 is configured to include a "case main body section 62A" configuring an outer shell of the antenna unit 38 and at which the antennas 64 are housed at an inner side thereof, a pair of attachment plate sections 62B, and a "locking section 62C". Furthermore, a penetrating section 62D is provided at the attachment plate section 62B at the one side in the vehicle width direction, and the attachment plate section 62B at the other side in the vehicle width direction is configured to be capable of holding a portion of the base member 40 together with the locking section 62C.

It should be noted that examples of types of the antennas 60 and the antennas 64 include an antenna for a data communication module (DCM), an antenna for a global positioning system (GPS), an antenna for a wireless local area network (LAN), an antenna for electronic toll collection (ETC), and the like.

Meanwhile, as illustrated in FIG. 1 to FIG. 3, the base member 40 is formed by pressing a steel plate and is configured to include a "lower wall section 40A", a peripheral wall section 40B, and an "upper wall section 40C" serving as an attachment piece section.

More specifically, the lower wall section 40A configures a portion at a vehicle lower side of the base member 40 and is configured to have a rectangular plate shape with a longitudinal direction thereof being the vehicle width direction when viewed from the vehicle up-down direction. Furthermore, a pair of "inserted-through sections 66" serving as base side inserted-through sections and an "inserted-through section 68" serving as a base side inserted-through section are formed at the lower wall section 40A.

The inserted-through sections 66 are formed by penetrating each of a portion of the lower wall section 40A at the one side in the vehicle width direction and a portion of the lower wall section 40A at the other side in the vehicle width direction, in the vehicle up-down direction, and are configured to have rectangular shapes with longitudinal directions thereof being the vehicle width direction when viewed from the vehicle up-down direction. Furthermore, the inserted-through sections 66 are configured such that the case main body section 58A of the case 58 can be inserted therethrough in the vehicle up-down direction.

Further, a weld nut 70 is provided at an upper surface of a portion of the lower wall section 40A at the one side, in the vehicle width direction, of the inserted-through section 66, and the attachment plate section 58B at the one side, in the vehicle width direction, of the case 58 is abutted against this portion of the lower wall section 40A from the vehicle lower side. Furthermore, a shaft section 72A of a bolt 72 inserted through the penetrating section 58D of the attachment plate section 58B is fastened at the weld nut 70 from the vehicle lower side.

Further, a peripheral edge at the other side, in the vehicle width direction, of the inserted-through section 66 is held between the attachment plate section 58B and the locking section 58C at the other side, in the vehicle width direction, of the case 58. That is to say, a main portion of the case main body section 58A is disposed at a vehicle upper side of the lower wall section 40A.

Meanwhile, the inserted-through section 68 is formed by penetrating a vehicle width direction central section of the lower wall section 40A in the vehicle up-down direction, and is configured to have a rectangular shape with a longitudinal direction thereof being the vehicle front-rear direction when viewed from the vehicle up-down direction. Furthermore, the inserted-through section 68 is configured such that the case main body section 62A of the case 62 can be inserted therethrough in the vehicle up-down direction.

Further, a weld nut 74 is provided at an upper surface of a portion of the lower wall section 40A at the one side, in the vehicle width direction, of the inserted-through section 68, and the attachment plate section 62B on the one side, in the vehicle width direction, of the case 62 is abutted against this portion of the lower wall section 40A from the vehicle lower side. Furthermore, a shaft section 76A of a bolt 76 inserted through the penetrating section 62D of the attachment plate section 62B is fastened at the weld nut 74 from the vehicle lower side.

Further, a peripheral edge at the other side, in the vehicle width direction, of the inserted-through section 68 is held between the attachment plate section 62B and the locking section 62C at the other side, in the vehicle width direction, of the case 62. That is to say, a main portion of the case main body section 62A is disposed at a vehicle upper side of the lower wall section 40A.

Meanwhile, the peripheral wall section 40B is configured to have a tubular shape provided so as to surround the lower wall section 40A when viewed from the vehicle up-down direction, and a cross-section of the peripheral wall section 40B viewed from the vehicle up-down direction is enlarged on progression from the vehicle lower side toward the vehicle upper side. Furthermore, the upper wall section 40C is provided at a peripheral edge at a vehicle upper side of the peripheral wall section 40B so as to follow along the peripheral edge.

The upper wall section 40C configures a portion at a vehicle upper side of the base member 40 and is configured to have a plate shape in the shape of a rectangular frame when viewed from the vehicle up-down direction, and a plurality of "weld bolts 78" and a plurality of bulging sections 40D are provided at the upper wall section 40C.

The weld bolts 78 are disposed at predetermined intervals in the vehicle width direction at four corners of the upper wall section 40C, at a portion at a vehicle front side of the upper wall section 40C, and at a portion at a vehicle rear side of the upper wall section 40C. Furthermore, the weld bolts 78 are in a state in which "head sections 78A" thereof are joined to the upper wall section 40C from the vehicle upper side, and "shaft sections 78B" thereof serving as fastening sections project from the upper wall section 40C toward the vehicle lower side.

Meanwhile, a plurality of "inserted-through sections 80" serving as vehicle body side inserted-through sections respectively corresponding to the weld bolts 78 are formed at the supporting piece sections 28, the supporting piece section 44, and the supporting piece section 54 of the vehicle body 12.

Furthermore, "nuts 82" serving as fastened members are fastened at the shaft sections 78B from the vehicle lower side in a state in which the upper wall section 40C is supported by the supporting piece sections 28, the supporting piece section 44, and the supporting piece section 54 from the vehicle lower side, and the shaft sections 78B of the weld bolts 78 are inserted through the inserted-through sections 80, whereby the base member 40 is fixed with respect to the roof section 20. It should be noted that distal end portions of the shaft sections 78B are positioned further toward the vehicle upper side than the lower wall section 40A.

Meanwhile, the bulging sections 40D are formed due to portions of the upper wall section 40C bulging toward the vehicle upper side, are disposed between the weld bolts 78, and extend in the vehicle width direction. Further, "upper wall sections 40D1" configuring portions at vehicle upper sides of the bulging sections 40D are positioned further toward the vehicle upper side than the head sections 78A of the weld bolts 78. Furthermore, a "resin roof panel 84" is attached to the upper wall sections 40D1.

The resin roof panel 84 is configured by a resin such as a polycarbonate or the like that is capable of transmitting radio waves, and is configured to have a plate shape extending in the vehicle width direction and the vehicle front-rear direction with a plate thickness direction thereof being the vehicle up-down direction. The resin roof panel 84 is disposed so as to cover all of the base member 40 from the vehicle upper side, and is joined to the upper wall sections 40D1 via joining sections 86 formed by an adhesive provided at the upper wall sections 40D1. That is to say, the upper wall sections 40D1 function as a joining surface section.

It should be noted that an upper surface of the resin roof panel 84 is coated with a paint, and this upper surface configures a portion of the design surface 20A of the roof section 20. Further, a seal member 88 is attached at a gap between an outer periphery of the resin roof panel 84 and the vehicle body 12.

Meanwhile, a ceiling member 90 is disposed at a vehicle lower side of the roof reinforcement 32 and the rear header reinforcement 34, and the ceiling member 90 includes a curved section 90A that is curved so as to be convex toward the vehicle upper side when viewed from the vehicle width direction, and a general section 90B that extends from the curved section 90A toward the vehicle rear side. Further, a rear end portion of the general section 90B is locked at the weather strip attached to the rear end portion of the rear side extending wall section 46E.

Further, in the present exemplary embodiment, a rear seat 92 is disposed at a position that overlaps with the curved section 90A when viewed from the vehicle up-down direction, and a predetermined clearance is secured between the rear seat 92 and the curved section 90A.

Operation and Effects of the Present Exemplary Embodiment

Next, operation and effects of the present exemplary embodiment will be explained.

As illustrated in FIG. 1 to FIG. 3, in the present exemplary embodiment, a pair of the supporting piece sections 28 that are disposed at an interval in the vehicle width direction, and the supporting piece section 44 and the supporting piece section 54 that are disposed at an interval in the vehicle front-rear direction, are provided at the roof section 20 of the vehicle body 12. Further, the base member 40 is attached to the supporting piece sections 28, the supporting piece section 44, and the supporting piece section 54 from the vehicle upper side. Furthermore, the base member 40 is in a state in which a portion thereof is disposed between the supporting piece sections 28 and between the supporting piece section 44 and the supporting piece section 54, and the antenna unit 36 and the antenna unit 38 are attached to the base member 40.

Further, the resin roof panel 84 is attached to the base member 40 from the vehicle upper side, and the antenna unit 36 and the antenna unit 38 are covered from the vehicle upper side by the resin roof panel 84. Due to this, the antenna unit 36 and the antenna unit 38 can be hidden by the resin roof panel 84 while enabling sending and receiving of radio waves by the antenna unit 36 and the antenna unit 38, at the vehicle upper side of the antenna unit 36 and the antenna unit 38.

Furthermore, in the present exemplary embodiment, as described above, the antenna unit 36, the antenna unit 38, and the resin roof panel 84 are attached to the base member 40, and these can be assembled with respect to the vehicle body 12 in a state in which they are integrated, i.e., in a state in which they are configured as an assembly, at the time of assembling the vehicle 10.

Accordingly, in the present exemplary embodiment, installation work of the antenna unit 36 and the antenna unit 38 with respect to the vehicle body 12 can be simplified.

Further, in the present exemplary embodiment, the upper wall section 40C of the base member 40 is supported from the vehicle lower side by the supporting piece sections 28, the supporting piece section 44, and the supporting piece section 54 provided at the roof section 20 of the vehicle body 12. Furthermore, the shaft sections 78B of the weld bolts 78 are provided at the upper wall section 40C, and the shaft sections 78B protrude from the upper wall section 40C toward the vehicle lower side.

Meanwhile, the inserted-through sections 80 through which the shaft sections 78B can be inserted are provided at the supporting piece sections 28, the supporting piece section 44, and the supporting piece section 54, and the nuts 82 are fastened at the shaft sections 78B from the vehicle lower side in a state in which the shaft sections 78B are inserted through the inserted-through sections 80. Consequently, in the present exemplary embodiment, when the assembly in which the base member 40, the antenna unit 36, the antenna unit 38, and the resin roof panel 84 are integrated is assembled to the vehicle body 12, the shaft sections 78B are inserted through the inserted-through sections 80, whereby positioning of the assembly can be carried out. As a result, in the present exemplary embodiment, efficiency of assembly work of the antenna unit 36 and the antenna unit 38 can be improved.

Further, in the present exemplary embodiment, the head sections 78A of the weld bolts 78 are joined to the upper wall section 40C of the base member 40 from the vehicle upper side, and the shaft sections 78B of the weld bolts 78 protrude from the upper wall section 40C toward the vehicle lower side. Consequently, in the present exemplary embodiment, the base member 40 can be more firmly attached to the vehicle body 12, as compared to a configuration in which the base member 40 is attached to the vehicle body 12 via a stud bolt joined to the upper wall section 40C. As a result, in the present exemplary embodiment, the antenna unit 36, the antenna unit 38, and peripheral components thereof can be fixed in a stable state.

Further, in the present exemplary embodiment, the antenna unit 36 includes the case 58 made of resin including the case main body section 58A configuring an outer shell thereof, and the locking section 58C provided at a portion at a vehicle lower side of the case main body section 58A. Furthermore, the antenna unit 38 includes the case 62 made of resin including the case main body section 62A configuring an outer shell thereof, and the locking section 62C provided at a portion at a vehicle lower side of the case main body section 62A.

Meanwhile, the inserted-through section 66 through which the case main body section 58A can be inserted in the vehicle up-down direction and the inserted-through section 68 through which the case main body section 62A can be inserted in the vehicle up-down direction are provided at the lower wall section 40A configuring a portion at a vehicle lower side of the base member 40. Further, in the present exemplary embodiment, the case 58 is attached, in detachable state, to the lower wall section 40A in a state in which the locking section 58C of the case 58 is locked at the peripheral edge of the inserted-through section 66 of the lower wall section 40A. Furthermore, the case 62 is attached, in a detachable state, to the lower wall section 40A in a state in which the locking section 62C of the case 62 is locked at the peripheral edge of the inserted-through section 68 of the lower wall section 40A.

Consequently, in the present exemplary embodiment, in a state in which the antenna unit 36, the antenna unit 38, the base member 40, and the resin roof panel 84 are attached to the vehicle body 12, the main portions of the antenna unit 36 and the antenna unit 38 are housed in a space between the lower wall section 40A of the base member 40 and the resin roof panel 84.

Furthermore, in a case in which maintenance work or the like is performed on the antenna unit 36 and the antenna unit 38, the case 58 and the case 62 are removed from the lower wall section 40A, and the locked state between the locking section 58C and the peripheral edge of the inserted-through section 66 and the locked state between the locking section 62C and the peripheral edge of the inserted-through section 68 are released, whereby the antenna unit 36 and the antenna unit 38 can be removed from the base member 40 toward the vehicle lower side.

Meanwhile, in a case in which the antenna unit 36 is re-installed, the antenna unit 36 can be attached to the lower wall section 40A in a state in which the case main body section 58A is inserted from the inserted-through section 66 to between the base member 40 and the resin roof panel 84, and in which the locking section 58C is locked at the peripheral edge of the inserted-through section 66 to position the antenna unit 36.

Further, in a case in which the antenna unit 38 is re-installed, the antenna unit 38 can be attached to the lower wall section 40A in a state in which the case main body section 62A is inserted from the inserted-through section 68 to between the base member 40 and the resin roof panel 84, and the locking section 62C is locked at the peripheral edge of the inserted-through section 68 to position the antenna unit 38.

Consequently, in the present exemplary embodiment, at the time of assembly of the vehicle 10, the base member 40, the antenna unit 36, the antenna unit 38, and the resin roof panel 84 can be assembled with respect to the vehicle body 12 in a state in which they are configured as an assembly, and at the time of performing maintenance or the like on the antenna unit 36 and the antenna unit 38, the antenna unit 36 and the antenna unit 38 can be attached and detached as a single body.

Accordingly, in the present exemplary embodiment, the installation work of the antenna unit 36 and the antenna unit 38 with respect to the vehicle body 12 can be simplified, while improving the efficiency of maintenance work on the antenna unit 36 and the antenna unit 38 from an inner side of the vehicle 10.

Further, in the present exemplary embodiment, a portion of the roof section 20 of the vehicle body 12 is configured by the roof reinforcement 32 and the rear header reinforcement 34. Furthermore, the roof reinforcement 32 configures a portion of the first closed cross-sectional structure section 42 that extends in the vehicle width direction and is configured to have a closed cross-sectional shape when viewed from the vehicle width direction.

Further, the rear header reinforcement 34 includes the second closed cross-sectional structure section 50 and the third closed cross-sectional structure section 52 that extend in the vehicle width direction and are configured to have a closed cross-sectional shape when viewed from the vehicle width direction. Consequently, in the present exemplary embodiment, the roof section 20 of the vehicle body 12 can be reinforced against loads caused by rollover or the like, by the first closed cross-sectional structure section 42, the second closed cross-sectional structure section 50, and the third closed cross-sectional structure section 52.

In addition, in the present exemplary embodiment, the inserted-through section 66 and the inserted-through section 68 are provided at the lower wall section 40A of the base member 40, and increase the probability that a head of an occupant seated in the rear seat 92 will contact something other than a metal component during rollover of the vehicle 10 or the like, contributing to a reduction in injury value.

Second Exemplary Embodiment

Figure 5:
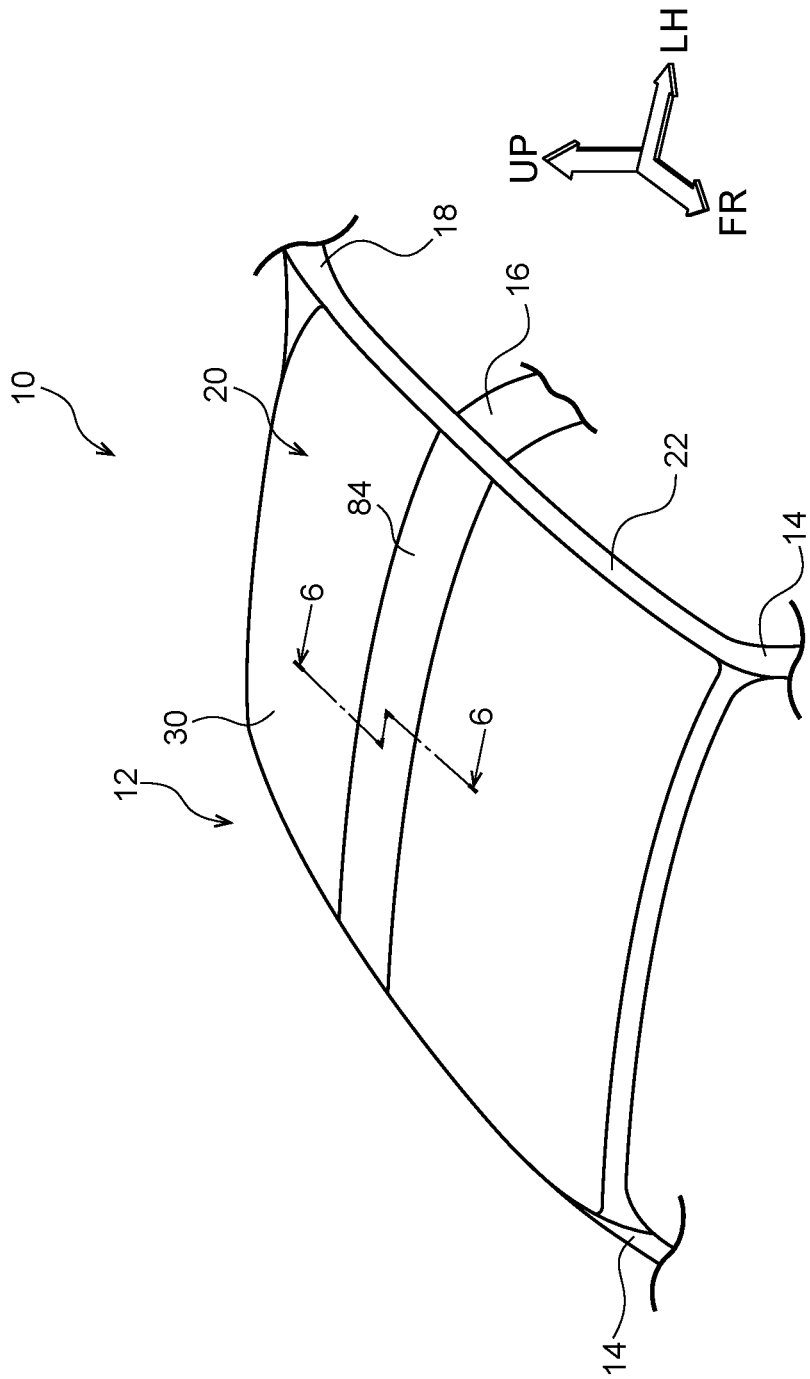
FIG. 5 is a perspective view schematically illustrating a configuration of a vehicle body to which a vehicle roof structure according to a second exemplary embodiment has been applied, viewed from a vehicle front left side.
Figure 6:
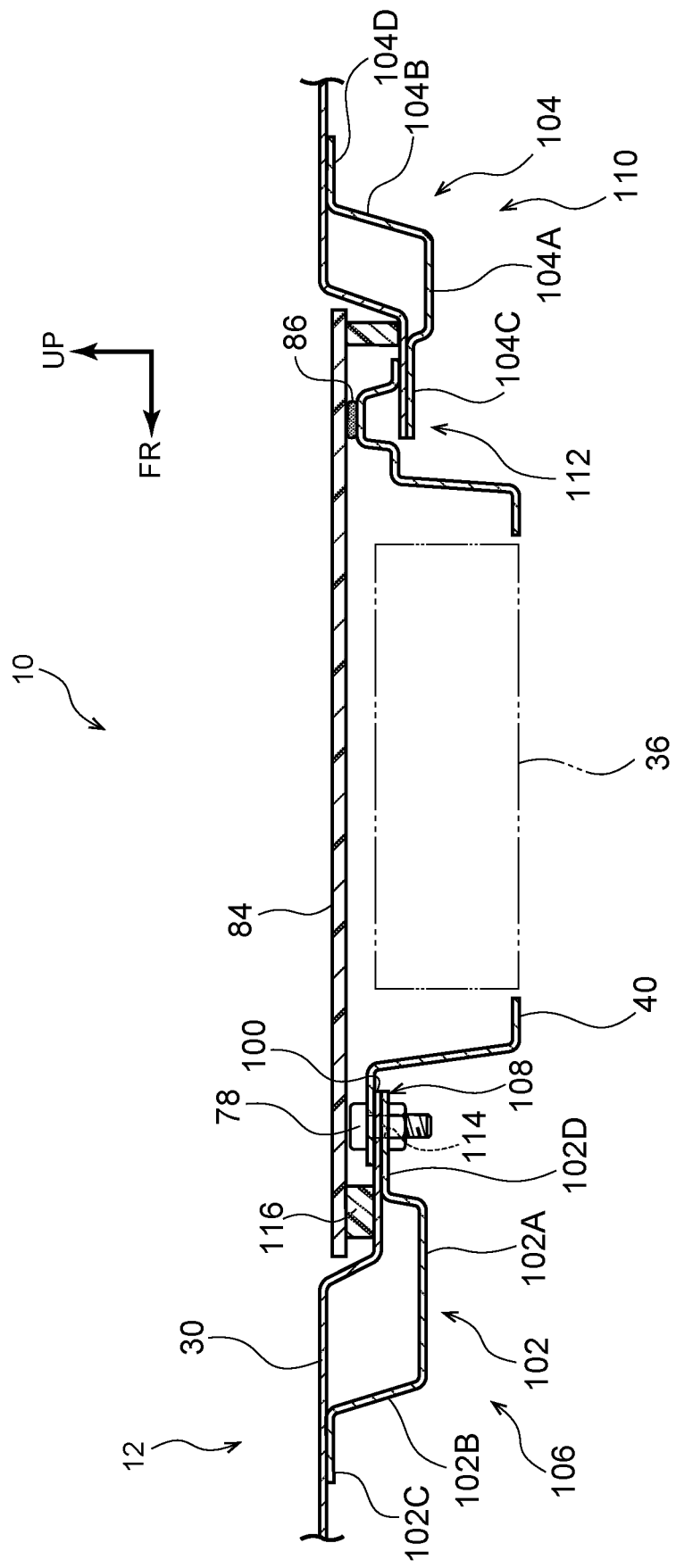
FIG. 6 is a cross-sectional view (cross-sectional view illustrating a state sectioned along a line 6-6 in FIG. 5) schematically illustrating a configuration of a main portion of a vehicle body to which the vehicle roof structure according to the second exemplary embodiment has been applied.

Next, a vehicle roof structure according to a second exemplary embodiment of the present disclosure will be explained, with reference to FIG. 5 and FIG. 6. In the present exemplary embodiment, a penetrating section 100 extending in the vehicle width direction is formed at a vehicle front-rear direction central section of the roof panel 30. Furthermore, a roof reinforcement 102 is disposed along a peripheral edge at a vehicle front side of the penetrating section 100, and a roof reinforcement 104 is disposed along a peripheral edge at a vehicle rear side of the penetrating section 100. It should be noted that the peripheral edges of the penetrating section 100 of the roof panel 30 are positioned further toward the vehicle lower side than portions of the roof panel 30 other than the peripheral edges.

More specifically, the roof reinforcement 102 is configured similarly to the roof reinforcement 32, so as to include a lower wall section 102A, a vertical wall section 102B, a front side extending wall section 102C, and a rear side extending wall section 102D, and is joined to the roof panel 30, similarly to the roof reinforcement 32.

Furthermore, in the present exemplary embodiment, a front side closed cross-sectional structure section 106 is configured by the roof panel 30 and the roof reinforcement 102, along the peripheral edge at the vehicle front side of the penetrating section 100. It should be noted that, hereafter, an aggregate of the peripheral edge at the vehicle front side of the penetrating section 100 of the roof panel 30 and the rear side extending wall section 102D, that is to say, a plate-shaped portion extending from the front side closed cross-sectional structure section 106 toward the vehicle rear side, will be referred to as a "supporting piece section 108".

Meanwhile, the roof reinforcement 104 is configured to include a lower wall section 104A, a vertical wall section 104B, a front side extending wall section 104C, and a rear side extending wall section 104D, and to be basically line-symmetrical with respect to the roof reinforcement 102 when viewed from the vehicle width direction, and is joined to the roof panel 30, similarly to the roof reinforcement 102.

Furthermore, in the present exemplary embodiment, a rear side closed cross-sectional structure section 110 is configured by the roof panel 30 and the roof reinforcement 104, along the peripheral edge at the vehicle rear side of the penetrating section 100. It should be noted that, hereafter, an aggregate of the peripheral edge at the vehicle rear side of the penetrating section 100 of the roof panel 30 and the front side extending wall section 104B, that is to say, a plate-shaped portion extending from the rear side closed cross-sectional structure section 110 toward the vehicle front side, will be referred to as a "supporting piece section 112".

Further, a plurality of "inserted-through sections 114" serving as vehicle body side inserted-through sections respectively corresponding to the weld bolts 78 provided at the base member 40 are formed at the supporting piece section 108 and the supporting piece section 112. Furthermore, the base member 40 is attached to the supporting piece section 108 and the supporting piece section 112, in a similar manner as to the supporting piece section 44 and the supporting piece section 54. It should be noted that, in the present exemplary embodiment, a seal member 116 is attached at a gap between the outer periphery of the resin roof panel 84 and the vehicle body 12 so as to follow along a peripheral edge of the penetrating section 100.

According to such a configuration, even in a case in which the antenna unit 36 and the antenna unit 38 cannot be disposed at a portion at the vehicle rear side of the roof section 20 due to specifications of the vehicle 10 or the like, basically the same effects as those of the first exemplary embodiment described above are exhibited.

Further, in a case in which the antenna unit 36 and the antenna unit 38 can be disposed at the portion at the vehicle rear side of the roof section 20, more space in which communication devices can be disposed can be secured at the vehicle body 12, and more communication devices can be mounted at the vehicle body 12.

SUPPLEMENTARY EXPLANATION OF THE EXEMPLARY EMBODIMENTS (1) Although the base member 40 is attached to the vehicle body 12 via the weld bolts 78 and the nuts 82 in the exemplary embodiments described above, the method of fixing the base member 40 at the vehicle body 12 is not limited thereto. For example, depending on the specifications of the vehicle 10 or the like, the base member 40 may be attached to the vehicle body 12 by a joining section formed by an adhesive or the like, an attachment member such as a clip, or the like.

(2) Further, although the weld nuts and the bolts are used to fix the antenna unit 36 and the antenna unit 38 at the base member 40 in the exemplary embodiments described above, the method of fixing the antenna unit 36 and the antenna unit 38 at the base member 40 is not limited thereto. For example, depending on the specifications of the vehicle 10 or the like, the antenna unit 36 and the antenna unit 38 may be attached to the base member 40 by a joining section formed by an adhesive or the like, an attachment member such as a clip, or the like.

(3) In addition, although the adhesive is used to fix the resin roof panel 84 at the base member 40 in the exemplary embodiments described above, the method of fixing the resin roof panel 84 at the base member 40 is not limited thereto. For example, depending on the specifications of the vehicle 10 or the like, the resin roof panel 84 may be attached to the base member 40 by an attachment member such as a clip, or the like.

What is claimed is:

1. A vehicle roof structure comprising:
    a pair of supporting piece sections that are provided at a roof section of a vehicle body, the pair of supporting piece sections being disposed at an interval in a vehicle front-rear direction or a vehicle width direction;
    a base member to which a communication device is attached, the base member being attached to the supporting piece sections from a vehicle upper side, in a state in which a portion of the base member is disposed between the supporting piece sections; and
    a resin roof panel that is attached to the base member from the vehicle upper side, the resin roof panel covering the communication device from the vehicle upper side, wherein:
    an attachment piece section that can be supported at the supporting piece sections from a vehicle lower side is provided at the base member,
    the vehicle roof structure further comprises a fastening section that is provided at the attachment piece section and that protrudes from the attachment piece section toward the vehicle lower side,
    a vehicle body side inserted-through section through which the fastening section can be inserted is provided at the supporting piece sections, and
    the vehicle roof structure further includes a fastened member that is fastened at the fastening section from the vehicle lower side in a state in which the fastening section is inserted through the vehicle body side inserted-through section.

2. The vehicle roof structure according to claim 1, wherein:
    a head section of a weld bolt including a shaft section serving as the fastening section is joined to the attachment piece section from the vehicle upper side, and
    the attachment piece section includes a joining surface section, the joining surface section being provided integrally with the attachment piece section, and the joining surface section being joined to the resin roof panel further toward the vehicle upper side than the head section.

3. The vehicle roof structure according to claim 1, wherein:
    the communication device includes a case made of resin that includes:
        a case main body section that configures an outer shell, and
        a locking section that is provided at a portion at a vehicle lower side of the case main body section;
    the base member includes a lower wall section that configures a portion at a vehicle lower side of the base member;
    a base side inserted-through section through which the case main body section can be inserted in a vehicle up-down direction is provided at the lower wall section, and the locking section can be locked at a peripheral edge of the base side inserted-through section; and
    the case is attached in a detachable state to the lower wall section.

4. A vehicle roof structure comprising:
    a pair of supporting piece sections that are provided at a roof section of a vehicle body, the pair of supporting piece sections being disposed at an interval in a vehicle front-rear direction or a vehicle width direction;
    a base member to which a communication device is attached, the base member being attached to the supporting piece sections from a vehicle upper side, in a state in which a portion of the base member is disposed between the supporting piece sections; and
    a resin roof panel that is attached to the base member from the vehicle upper side, the resin roof panel covering the communication device from the vehicle upper side, wherein:
    the communication device includes a case made of resin that includes:
        a case main body section that configures an outer shell, and a locking section that is provided at a portion at a vehicle lower side of the case main body section;

the base member includes a lower wall section that configures a portion at a vehicle lower side of the base member;

a base side inserted-through section through which the case main body section can be inserted in a vehicle up-down direction is provided at the lower wall section, and the locking section can be locked at a peripheral edge of the base side inserted-through section; and the case is attached in a detachable state to the lower wall section.

* * * * *